(12) United States Patent
Pappafotis et al.

(10) Patent No.: US 8,858,789 B1
(45) Date of Patent: Oct. 14, 2014

(54) SYSTEM FOR OIL SPILL CLEAN UP AND OIL RECOVERY

(75) Inventors: Jason M. Pappafotis, Panama City, FL (US); Daniel J. Flisek, Panama City, FL (US); David M. Robinson, Panama City, FL (US)

(73) Assignee: The United States of America as represeted by the Secretary of the Navy, Washington, DC (US)

( * ) Notice: Subject to any disclaimer, the term of this patent is extended or adjusted under 35 U.S.C. 154(b) by 775 days.

(21) Appl. No.: 13/065,357

(22) Filed: May 3, 2011

(51) Int. Cl.
| | |
|---|---|
| *E02B 15/04* | (2006.01) |
| *C02F 1/28* | (2006.01) |
| *C02F 103/00* | (2006.01) |
| *B01J 20/34* | (2006.01) |
| *B01J 20/28* | (2006.01) |
| *B01J 20/32* | (2006.01) |
| *C02F 101/32* | (2006.01) |

(52) U.S. Cl.
CPC ............... *E02B 15/04* (2013.01); *C02F 1/288* (2013.01); *C02F 2103/007* (2013.01); *B01J 20/3483* (2013.01); *B01J 20/28007* (2013.01); *B01J 20/3242* (2013.01); *C02F 2101/32* (2013.01); *B01J 20/3204* (2013.01); *B01J 20/28038* (2013.01); *E02B 15/045* (2013.01); *Y10S 210/923* (2013.01)
USPC ........ 210/184; 210/237; 210/258; 210/323.1; 210/324; 210/332; 210/335; 210/408; 210/491; 210/495; 210/496; 210/498; 210/502.1; 210/509; 210/923

(58) Field of Classification Search
CPC ....... E02B 1/288; E02B 15/04; E02B 15/045; C02F 1/288; C02F 2101/32; C02F 2103/007; B01D 15/00; B01J 20/3483; B01J 20/28007; B01J 20/3242; B01J 20/28038; B01J 20/3204
USPC .......... 210/236, 237, 242.3, 242.4, 252, 258, 210/323.1, 324, 335, 416.1, 495, 496, 210/502.1, 509, 923, 671, 680, 691, 924, 210/184, 332, 408, 416.5, 491, 498
See application file for complete search history.

(56) References Cited

U.S. PATENT DOCUMENTS

| | | | | |
|---|---|---|---|---|
| 660,151 | A * | 10/1900 | Doral | 210/184 |
| 3,752,762 | A * | 8/1973 | Cinotta | 210/671 |
| 4,059,528 | A * | 11/1977 | Grosshandler | 210/282 |
| 5,948,266 | A * | 9/1999 | Gore et al. | 210/693 |
| 6,536,061 | B1 * | 3/2003 | Middleton | 8/159 |
| 6,616,834 | B2 * | 9/2003 | Anderson | 210/155 |
| 2010/0086604 | A1 * | 4/2010 | Stellacci et al. | 424/489 |

OTHER PUBLICATIONS

Yuan et al, Superwetting Nanowire Membranes for Selective Absorption, May 2008, Nature Nanotechnology, vol. 3, pp. 332-336.*

* cited by examiner

*Primary Examiner* — Matthew O Savage
(74) *Attorney, Agent, or Firm* — James T. Shepherd

(57) ABSTRACT

A system for cleaning up an oil spill and recovering the spilled oil includes frames supporting superhydrophobic oil-absorbing nanowires. A first container supports the frames with the nanowires. A mixture of oil and water is pumped into the first container where the oil from the mixture is absorbed by the nanowires as water is separated from the mixture and deposited in the first container where it is then pumped therefrom. A second container supports the frames with the oil so-absorbed by the nanowires. The frames with the oil so-absorbed by the nanowires are heated whereby the oil so-absorbed separates from the nanowires and is deposited in the second container. The oil so-deposited in the second container is then pumped therefrom.

16 Claims, 3 Drawing Sheets

SYSTEM FOR OIL SPILL CLEAN UP AND OIL RECOVERY

ORIGIN OF THE INVENTION

The invention described herein may be manufactured and used by or for the Government of the United States of America for Governmental purposes without payment of any royalties thereon or therefore.

FIELD OF THE INVENTION

The invention relates generally to oil spill cleanup, and more particularly to a system that cleans up an oil spill while also recovering the oil.

BACKGROUND OF THE INVENTION

Currently, a number of methods and systems are used to clean up an oil spill from a water environment. In one approach, chemical dispersants are used to sink the oil or break it up so that it can be consumed and/or buried by natural processes. However, this keeps the oil present in the water environment for a long period of time. Other methods/systems are designed to absorb oil from the surface of the water using absorbing substances such as hay or human hair. Regardless of the absorbent used, the absorbing substance and the absorbed oil must then be incinerated which releases toxins into the atmosphere. Still other methods/systems are designed to bring large mixtures of oil and water to a shore-based processing location where lengthy oil/water separation processes are used. However, theses approaches are inefficient and slow.

SUMMARY OF THE INVENTION

Accordingly, it is an object of the present invention to provide a system that can clean up an oil spill on water and recover the oil.

Another object of the present invention is to provide a system that is readily deployed to an oil spill on water, can clean up the oil spill, and can recover the oil.

Other objects and advantages of the present invention will become more obvious hereinafter in the specification and drawings.

In accordance with the present invention, a system for cleaning up an oil spill and recovering the spilled oil is provided. Rigid and porous frames support superhydrophobic oil-absorbing nanowires. A first container supports the frames with the nanowires supported thereon. A mixture of oil and water is pumped into the first container where the oil from the mixture is absorbed by the nanowires as water is separated from the mixture and deposited in the first container. The water so-deposited in the first container is then pumped therefrom. A second container supports the frames with the oil so-absorbed by the nanowires. At least one device, coupled to at least one of the second container and the frames with the oil so-absorbed by the nanowires, heats the oil so-absorbed. As a result of such heating, the oil so-absorbed separates from the nanowires and is deposited in the second container. The oil so-deposited in the second container is then pumped therefrom.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
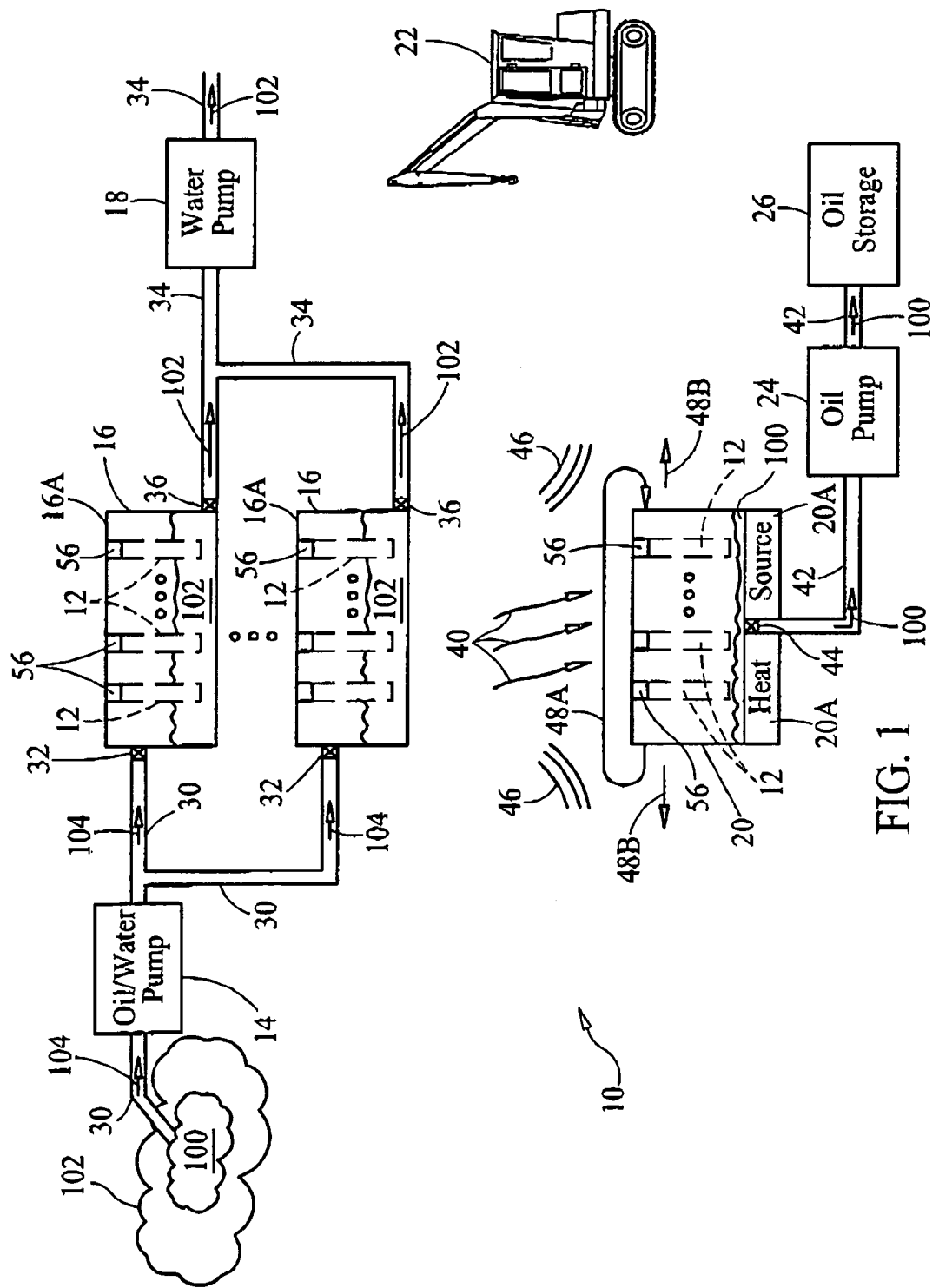
FIG. 1 is a schematic view of a system for cleaning up an oil spill and recovering the spilled oil in accordance with an embodiment of the present invention.

Referring now to the drawings and more particularly to FIG. 1, a system for cleaning up an oil spill 100 on water and recovering the spilled oil is illustrated and is referenced generally by numeral 10. Typically, oil spill 100 is at or near the surface of a body of water 102. System 10 is ideally constructed of modular components to facilitate its transport to the site of an oil spill. System components can be designed for ship-based transportation and deployment or ground-based transportation and deployment without departing from the scope of the present invention.

Figure 2:
FIG. 2 is a scanning electron microscopy (SEM) image of silicone-coated cryptomelane-type manganese oxide nanowires that will be coupled to frames in order to construct superhydrophobic oil-absorbing membranes in accordance with an embodiment of the present invention.

At the heart of system 10 are a number of superhydrophobic oil-absorbing membranes 12, each of which will be identically constructed. Each membrane 12 is defined by a rigid frame that supports a material that is both superhydrophobic (i.e., repels water) and absorbs oil. By way of example, this material can be a random mesh of silicone-coated, cryptomelane-type manganese oxide nanowires. A scanning electron microscopy (SEM) of such nanowires is illustrated in FIG. 2. The random orientation and intertwining nature of the nanowires results during the fabrication thereof. Details of such fabrication are disclosed by J. Yuan et al. in "Superwetting Nanowire Membranes for Selective Absorption," Nature Technology, Vol. 3, pp. 332-336, June 2008, the contents of which are hereby incorporated by reference.

In accordance with the present invention, the silicone-coated, cryptomelane-type manganese oxide nanowires are fabricated on a rigid frame for use in system 10 as membranes 12. Two exemplary frame constructions are illustrated in plan view in FIGS. 3 and 4. It is to be understood that other frame constructions could be used without departing from the scope of the present invention.

Figure 3:
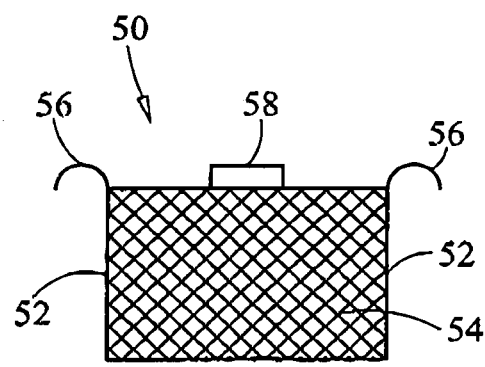
FIG. 3 is a plan view of a frame used to construct an oil-absorbing membrane in accordance with an embodiment of the present invention.

Frame 50 in FIG. 3 includes a rectangular rigid border 52 (e.g., made from metal, composite, etc.) serving as the support for an interior lattice region 54 on which the above-described nanowires are fabricated. That is, lattice region 54 is present in the fabrication environment of the nanowires so that the resulting intertwining mesh (illustrated in FIG. 2) becomes intertwined with lattice region 54 thereby coupling the nanowires to frame 50. Opposing hooks 56 can be provided at either side of rigid border 52 to facilitate the suspension of frame 50 in the various containers used in system 10 as will be explained further below. Located centrally between hooks 56 and coupled to rigid border 52 is an eye 58 for cooperation with a crane's hook such that frame 50 can be lifted/moved as will also be explained further below.

Figure 4:
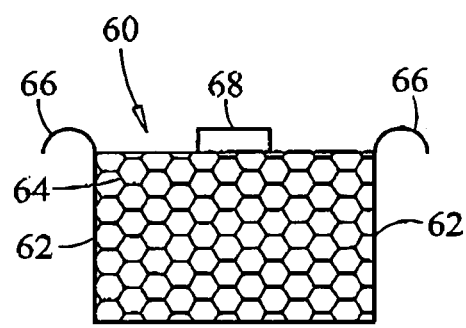
FIG. 4 is a plan view of a frame used to construct an oil-absorbing membrane in accordance with another embodiment of the present invention.

Frame 60 in FIG. 4 is similar to frame 50 in that it includes a rigid rectangular border 62, hooks 66, and eye 68. In frame 60, border 62 serves as the support for an interior honeycomb region 64 which will be present in the fabrication environment of the nanowires so that they become intertwined and are essentially coupled to frame 60.

Referring again to FIG. 1, membranes 12 (constructed from a rigid frame and nanowires as described above) are used to separate oil from water in system 10. Prior to describing the operation of system 10, the various elements thereof will be defined. The conduits used to transfer fluid between the elements can be rigid, flexible, and generally constructed in a variety of ways without departing from the scope of the present invention. The same holds true for the various valves used in system 10.

System 10 includes a pump 14 capable of pumping a mixture of oil 100 and water 102 to one or a series of containers 16 that can each hold a number of superhydrophobic oil-absorbing membranes 12 therein. System 10 also includes a pump 18 capable of pumping water from container(s) 16, a container 20 that can hold a number of membranes 12 after they have been saturated with oil, a crane (or crane-like device) 22 for lifting/moving membranes 12, a pump 24 for pumping oil from container 20, and (optionally) an oil storage container 26. Each of pumps 14, 18 and 24 can be a commercially-available or customized pump without departing from the scope of the present invention. Container(s) 16 can also be standard containers (e.g., conventional conex shipping containers) or custom-designed containers without departing from the scope of the present invention.

In the illustrated embodiment, containers 16 are standard rectangular shipping containers with the tops thereof being removed so that membranes 12 can be dropped therein and suspended therefrom as shown. That is, hooks 56 engage opposing top edges of containers 16 (one top edge 16A is visible in FIG. 1) so that membranes 12 are suspended in containers 16. Prior to use in system 10, the nanowires on membranes 12 are free of any absorbed oil.

When it is time to clean up the oil spill, pump 14 pumps a mixture 104 of oil 100 and water 102 into one or more containers 16 via conduits 30 and valves 32. As container(s) 16 fill with mixture 104, membranes 12 absorb oil 100 while repelling water 102. As a result, water 102 collects in container(s) 16 and can be pumped therefrom by water pump 18 via conduits 34 and valves 36. Water 102 can be pumped back to its original environment or any other appropriate location without departing from the scope of the present invention. This process is continued until membranes 12 are saturated with oil 100. Once this occurs, membranes 12 with the absorbed oil are removed from container(s) 16 using, for example, crane 22. The oil-saturated membranes 12 are then transferred to container 20 for oil recovery. Container 20 can also be a standardized shipping container with its top removed so that oil-saturated membranes 12 can be dropped therein and suspended therefrom as described for containers 16.

Oil is released from membranes 12 when membranes 12 are heated. Such heat can be applied from an external source (not shown) and directed into container 20 as indicated by wavy arrows 40. Heat can be supplied in a variety of ways without departing from the scope of the present invention. For example, heat can be provided by a heat source 20A adjacent or coupled to container 20. Another option is for container 20 to be constructed as a large oven that includes its own heat source. Regardless of how the heat is applied, oil 100 is released from membranes 12 during the heating thereof and is deposited in container 20 where it can be pumped (for example) to storage container 26 using oil pump 24 and conduits 42/valve 44. The release of oil 100 from membranes 12 can be hastened by additionally exposing membranes 12 to acoustic (resonance) energy 46 and/or motion such as rotational motion (i.e., spinning container 20 as indicated by rotation arrow 48A) or shaking motion (as indicated by opposing arrows 48B). Once membranes 12 are again free of oil, they can be returned to container(s) 16 for re-use.

The advantages of the present invention are numerous. The oil spill is cleaned up and the oil is recovered in an efficient fashion using the re-usable superhydrophobic oil-absorbing membranes. At the same time, the water repelled by the membranes is ready to be returned to its original environment. The system lends itself to construction from modular components so that the entire set-up can be readily transported to an oil spill.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for cleaning up an oil spill and recovering the spilled oil, comprising:
    a plurality of rigid frames, each of said frames including a porous region constructed from one of a lattice and a honeycomb;
    oil-absorbing superhydrophobic nanowires intertwined with said porous region of each of said frames wherein an assembly is defined by each of said frames with said nanowires intertwined with said porous region thereof;
    a first container for supporting at least one said assembly;
    a first pump coupled to said first container and adapted to pump a mixture of oil and water into said first container, wherein oil is absorbed from the mixture by said nanowires as water is separated from the mixture and deposited in said first container;
    a second pump coupled to said first container for pumping out said water so-deposited therein;
    a second container for supporting at least one said assembly with said oil so-absorbed by said nanowires thereof;
    at least one device, coupled to at least one of said second container and each said assembly with said oil so-absorbed by said nanowires thereof, for heating said oil so-absorbed, wherein said oil so-absorbed separates from said nanowires and is deposited in said second container; and
    a third pump coupled to said second container for pumping out said oil so-deposited therein.

2. A system as in claim 1, wherein said nanowires comprise cryptomelane nanowires coated with silicone.

3. A system as in claim 1, wherein said first container and said second container are rectangular and are open at a top thereof.

4. A system as in claim 3, wherein each of said frames is configured to be supported at said top for suspension within either of said first container and said second container.

5. A system as in claim 1, further comprising a crane for transferring said at least one assembly with said oil so-absorbed by said nanowires thereof between said first container and said second container.

6. A system as in claim 1, further comprising means for exposing said at least one assembly with said oil so-absorbed by said nanowires thereof during the heating thereof to at least one of acoustic energy and motion.

7. A system for cleaning up an oil spill and recovering the spilled oil, comprising:
    a plurality of frames, each of said frames being rigid and porous;
    cryptomelane nanowires coated with silicone intertwined with a portion of each of said frames wherein corresponding assemblies are defined;
    a container for supporting said assemblies;
    a first pump coupled to said container and adapted to pump a mixture of oil and water into said container, wherein oil is absorbed from the mixture by said cryptomelane nanowires coated with silicone as water is separated from the mixture and deposited in said container;
    a second pump coupled to said container for pumping out said water so-deposited therein;
    an oven;
    a crane for transferring said assemblies with said oil so-absorbed from said container to said oven;
    said oven heating said assemblies with said oil so-absorbed, wherein said oil so-absorbed separates from said cryptomelane nanowires coated with silicone and is deposited in said oven; and
    a third pump coupled to said oven for pumping out said oil so-deposited therein.

8. A system as in claim 7, wherein each of said frames includes a region defined by a lattice with said cryptomelane nanowires coated with silicone being intertwined therewith.

9. A system as in claim 7, wherein each of said frames includes a region defined by a honeycomb with said nanowires coated with silicone being intertwined therewith.

10. A system as in claim 7, wherein said container and said oven are rectangular.

11. A system as in claim 7, wherein each of said assemblies is configured for suspension within either of said container and said oven.

12. A system as in claim 7, further comprising means for exposing said assemblies with said oil so-absorbed during the heating thereof to at least one of acoustic energy and motion.

13. A system for cleaning up an oil spill and recovering the spilled oil, comprising:
    a plurality of rigid frames, each of said frames defining a region constructed of one of a lattice and a honeycomb;
    cryptomelane nanowires coated with silicone intertwined with said region of each of said frames wherein corresponding assemblies are defined;
    a container for supporting said assemblies;
    a first pump coupled to said container and adapted to pump a mixture of oil and water into said container, wherein oil is absorbed from the mixture by said cryptomelane nanowires coated with silicone as water is separated from the mixture and deposited in said container;
    a second pump coupled to said container for pumping out said water so-deposited therein;
    an oven;
    a crane for transferring said assemblies with said oil so-absorbed from said container to said oven;
    said oven heating said assemblies with said oil so-absorbed, wherein said oil so-absorbed separates from said cryptomelane nanowires coated with silicone and is deposited in said oven; and
    a third pump coupled to said oven for pumping out said oil so-deposited therein.

14. A system as in claim 13, wherein said container and said oven are rectangular.

15. A system as in claim 13, wherein each of said assemblies is configured for suspension within either of said container and said oven.

16. A system as in claim 13, further comprising means for exposing said assemblies with said oil so-absorbed during the heating thereof to at least one of acoustic energy and motion.

* * * * *